United States Patent
Stewart et al.

(10) Patent No.: US 11,874,880 B2
(45) Date of Patent: Jan. 16, 2024

(54) APPARATUSES AND METHODS FOR CLASSIFYING A USER TO A POSTING

(71) Applicant: MY JOB MATCHER, INC., Austin, TX (US)

(72) Inventors: Arran Stewart, Austin, TX (US); Steve O'Brien, Raleigh, NC (US)

(73) Assignee: MY JOB MATCHER, INC.

( * ) Notice: Subject to any disclaimer, the term of this patent is extended or adjusted under 35 U.S.C. 154(b) by 0 days.

(21) Appl. No.: 17/667,651

(22) Filed: Feb. 9, 2022

(65) Prior Publication Data

US 2023/0252341 A1   Aug. 10, 2023

(51) Int. Cl.
G06F 16/90  (2019.01)
G06F 16/906 (2019.01)
G06F 16/953 (2019.01)

(52) U.S. Cl.
CPC .......... G06F 16/906 (2019.01); G06F 16/953 (2019.01)

(58) Field of Classification Search
CPC ............................ G06F 16/906; G06F 16/953
See application file for complete search history.

(56) References Cited

U.S. PATENT DOCUMENTS

| | | | |
|---|---|---|---|
| 7,624,159 B2 | 11/2009 | Kohs | |
| 8,666,994 B2 | 3/2014 | Ogilvy et al. | |
| 9,830,575 B1 | 11/2017 | Mund | |
| 10,007,707 B1 | 6/2018 | Balasia et al. | |
| 10,769,136 B2* | 9/2020 | Ozcaglar | G06F 16/9535 |
| 2013/0046704 A1* | 2/2013 | Patwa | G06Q 10/06 705/321 |
| 2014/0122355 A1 | 5/2014 | Hardtke et al. | |
| 2016/0196534 A1 | 7/2016 | Jarrett et al. | |
| 2017/0154313 A1* | 6/2017 | Duerr | G06F 16/24578 |
| 2018/0308062 A1 | 10/2018 | Quitmeyer | |
| 2019/0220824 A1 | 7/2019 | Liu | |
| 2020/0175393 A1 | 6/2020 | Gee et al. | |
| 2020/0193382 A1 | 6/2020 | Michaels | |
| 2021/0103876 A1 | 4/2021 | Petrosso et al. | |
| 2021/0133266 A1* | 5/2021 | Zhang | G06N 20/00 |
| 2021/0303437 A1* | 9/2021 | Karri | G06F 3/013 |

OTHER PUBLICATIONS

Gawande et al., A Novel Approach for Job Mining and Trend Summarization on Social Media Posts, 2017 [retrieved on Apr. 12, 2023], IJETT 4. Retrieved from the Internet: https://scholar.archive.org/work/pnzcilduvraixj6kksehe56q4i/access/wayback/http://www.ijett.in/index.php/IJETT/article/viewFile/388/267 (Year: 2017).*

Guo, Resumatcher: A Personalized Resume—Job Matching System, May, 31, 2015.

* cited by examiner

*Primary Examiner* — Kristopher Andersen
(74) *Attorney, Agent, or Firm* — Caldwell Intellectual Property Law

(57) ABSTRACT

Aspects relate to apparatuses and methods for using machine learning to classify a user to a posting. An exemplary apparatus includes at least a processor and a memory communicatively connected to the processor, the memory containing instructions configuring the processor to acquire a plurality of user inputs from a user, acquire a plurality of posting inputs from postings, associate each posting input of the plurality of posting inputs to a posting category, compare the plurality of user inputs to the plurality of posting inputs, and classify the user to a posting category as a function of the comparison.

16 Claims, 8 Drawing Sheets

APPARATUSES AND METHODS FOR CLASSIFYING A USER TO A POSTING

FIELD OF THE INVENTION

The present invention generally relates to the field of search engine apparatuses. In particular, the present invention is directed to apparatuses and methods for classifying a user to a posting.

BACKGROUND

Search engines have become an everyday necessity over the years. Its advantages as a database and research tool are manifest. However, present ways of utilizing search engines to match a jobseeker to a job listing are not capable of optimizing the best search results to a jobseeker.

SUMMARY OF THE DISCLOSURE

In an aspect, an apparatus for using machine learning to classify a user to a posting, wherein the apparatus includes at least a processor and a memory communicatively connected to the processor, the memory containing instructions configuring the processor to acquire a plurality of user inputs from a user, acquire a plurality of posting inputs from postings, associate each posting input of the plurality of posting inputs to a posting category, compare the plurality of user inputs to the plurality of posting inputs, and classify the user to a posting category as a function of the comparison.

In another aspect, a method for using machine learning to classify a user to a posting, wherein method utilizes a computing device configured to acquire a plurality of user inputs from a user, acquire a plurality of posting inputs from postings, associate each posting input of the plurality of posting inputs to a posting category, compare the plurality of user inputs to the plurality of posting inputs, and classify the user to a posting category as a function of the comparison.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for classifying a user to a posting. In an embodiment, a job resume may be used to classify a user to a job posting.

Aspects of the present disclosure can be used to optimize search results of job postings based on specific information contained in a user's job resume to give best matching job postings. Aspects of the present disclosure can also be used to add appeal to a job application. Exemplary embodiments illustrating aspects of the present disclosure are described below in the context of several specific examples.

Figure 1:
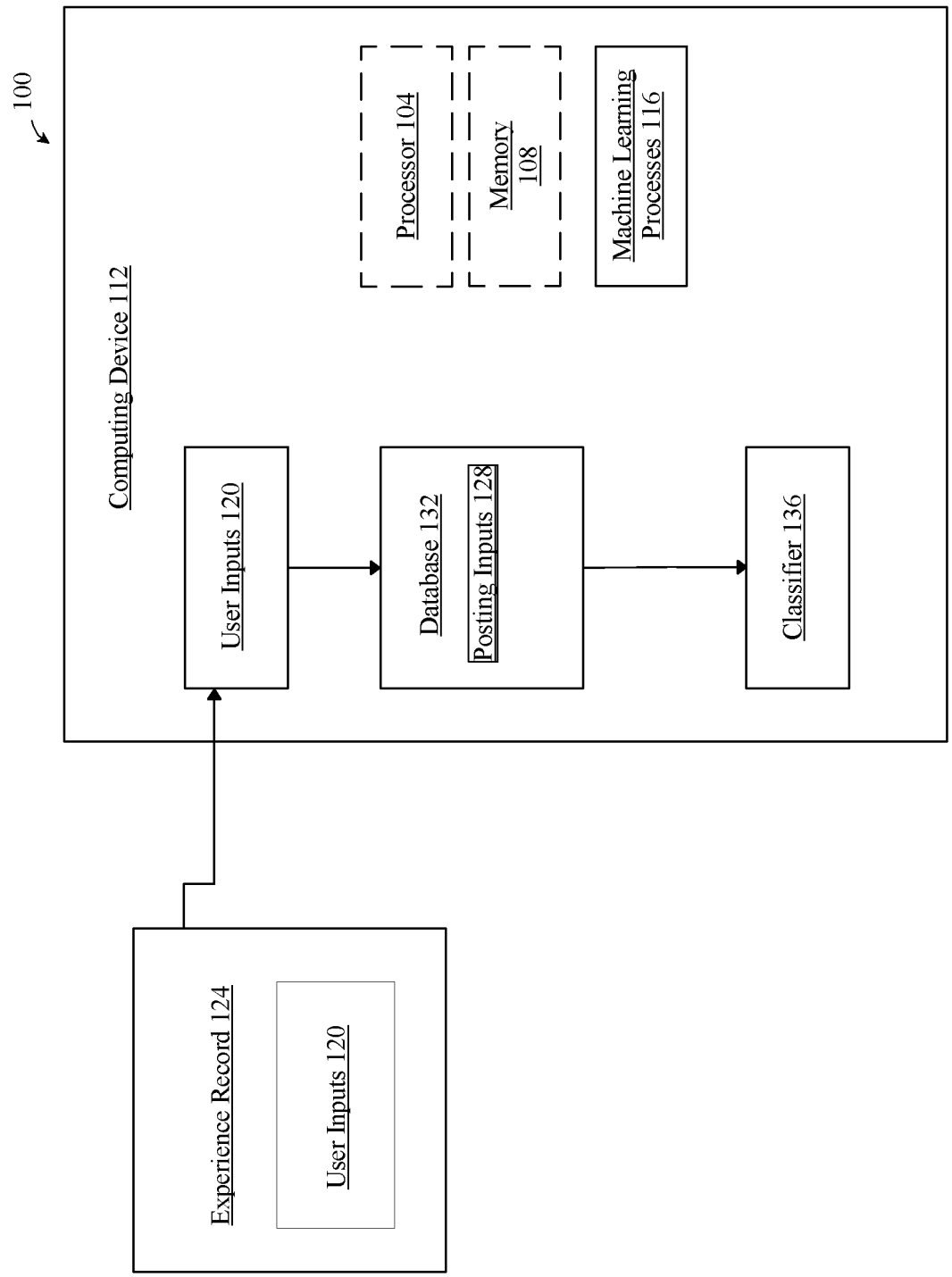
FIG. 1 is a block diagram of an exemplary apparatus for classifying a user to a posting.

Referring now to FIG. 1, an exemplary embodiment of apparatus 100 for classifying a user to a job posting is illustrated. Apparatus 100 includes processor 104 and memory 108 communicatively connected to processor 104, wherein memory 108 contains instructions configuring processor 104 to carry out the classifying process. In some embodiments, apparatus 100 may include computing device 112. Apparatus 100 may be communicatively connected to computing device 112. As used in this disclosure, "communicatively connected" means connected by way of a connection, attachment, or linkage between two or more related which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Computing device 112 may include any computing device as described in this disclosure, including without limitation a microcontroller, microprocessor, digital signal processor (DSP) and/ or system on a chip (SoC) as described in this disclosure. Computing device 112 may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 112 may include but is not limited to, for example, a computing device or cluster of computing devices in a first location and a second computing device or cluster of computing devices in a second location. Computing device 112 may include one or more computing devices dedicated to data storage, security, distribution of traffic for load balancing, and the like. Computing device 112 may distribute one or more computing tasks as described below across a plurality of computing devices of computing device, which may operate in parallel, in series, redundantly, or in any other manner used for distribution of tasks or memory between computing devices. Computing device 112 may be implemented using a "shared nothing" architecture in which data is cached at the worker, in an embodiment, this may enable scalability of apparatus 100 and/or computing device 112.

With continued reference to FIG. 1, processor 104 and/or computing device 112 may be designed and/or configured by memory 108 to perform any method, method step, or sequence of method steps in any embodiment described in this disclosure, in any order and with any degree of repetition. For instance, processor 104 and/or computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Processor 104 and/or computing device 112 may perform determinations, classification, and/or analysis steps, methods, processes, or the like as described in this disclosure using machine learning processes 116. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language.

Still referring to FIG. 1, processor 104 and/or computing device 112 is configured to classify user to posting. As used in this disclosure, a "user" is a person or entity such as a jobseeker or a job placement firm. A "posting" is a digital job listing by an employer, listing hiring requirements of a jobseeker. Processor 104 and/or computing device 112 is configured to acquire a plurality of user inputs 120, as well as a plurality of posting inputs 128. Postings may be stored in posting database 132 in wherein multiple job listings are stored and is continuously uploaded to by employers. As used in this disclosure, a "user input" is an element of data describing one or more user characteristics, for instance and without limitation, information illustrated in experience record 124. An "experience record" is a listing of user skills, experiences, credentials, and the like, such as a resume document. User input may include information on matters such as hobbies, personality traits, key projects, work experience, and the like. As used in this disclosure, a "posting input" is the hiring requirements of the employer, such as skills, years of experience, work environment, credentials, desired employee personality traits, previous experience, and the like. In some embodiments, processor 104 and/or computing device 112 may utilize a language processing module to extract user inputs 120 and postings inputs 120 from textual data.

Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by processor 104 and/or computing device 112 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at processor 104 and/or computing device 112, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Experience-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 and/or computing device 112 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104 and/or computing device 112. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York. In some embodiments, experience record 124 and the plurality of postings may be in the form of video records wherein verbal and non-verbal user and posting inputs are transcribed into textual data, as described in U.S. Nonprovisional application Ser. No. 17/582,070, filed on Jan. 24, 2022, and entitled "APPARATUSES AND METHODS FOR PARSING AND COMPARING VIDEO RESUME DUPLICATIONS," and U.S. Nonprovisional application Ser. No. 17/487,157, filed on Sep. 28, 2021, and entitled "SYSTEMS AND METHODS FOR PARSING AND CORRELATING SOLICITATION VIDEO CONTENT," each of which is entirely incorporated herein by reference.

Still referring to FIG. 1, processor 104 and/or computing device 112 is configured to associate each posting input of a plurality of posting inputs to a posting category. As used in this disclosure, a "posting category" is a grouping of inputs in a posting, as previously defined, based on specific textual relations to a sector of information. In some embodiments, a posting category may group input associated with job titles, salaries, locations, experience, technological backgrounds, and the like from a posting. For example, posting inputs such as "65k starting salary", "20k signing bonus" and "Gas Mileage Reimbursement" may be grouped into a salary posting category. Processor 104 and/or computing device 112 may use classifier to match posting inputs to a particular posting category. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifier may be configured to output at least a datum that labels or otherwise identifies a set of data that are clustered together, found to be close under a distance metric as described below, or the like. For example, a plurality posting inputs may be classifier inputs that get outputted to a plurality of posting categories outputs. In some embodiments, classifier training data may include posting database, wherein database includes a plurality of input entries of postings. Classifier training data may also include sample posting categories from a plurality of postings. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 and/or computing device 112 is configured to compare a plurality of user inputs 120 to a plurality of posting inputs 128. Comparison may be based on similarity and/or compatibility. Similarity results may be depicted as a similarity score that represents a degree of similarity between the user experience record 124 and the posting. For example, similarity score may include a metric range on scale of 0 (user input 120 least like posting input) to 10 (exact same as posting input). It could also include a range of percentages and may cover any suitable range or rating score. In some embodiments, the similarity score may be determined by using solely or in combination the language processing module previously disclosed, machine-learning processes, linear regression techniques, and the like. Alternatively or additionally, comparison may include classification as described in further detail below.

Still referring to FIG. 1, processor 104 and/or computing device 112 may utilize a machine learning processes 116 to conduct the comparison of user and posting inputs. In some embodiments, a machine learning algorithm input may be the plurality of user inputs 120, wherein the training data may be the inputs extracted from posting database 132, and the algorithm output may be the similarity score.

Still referring to FIG. 1, additionally or alternatively, processor 104 and/or computing device 112 may be utilize a knowledge-based system (KBS) to compare inputs for compatibility. As used in this disclosure, a KBS is a computer program that reasons and uses a knowledge base to solve complex problems. The KBS has two distinguishing features: a knowledge base and an inference engine. A knowledge base may include technology used to store complex structured and unstructured information used by a computer system, often in some form of subsumption ontology rather than implicitly embedded in procedural code. Other common approaches in addition to a subsumption ontology include frames, conceptual graphs, and logical assertions. In some embodiments, the knowledge base may be a storage hub that contains information about past matches of users to postings based on the similarity of inputs and feedback from users and employers about the compatibility of matches. Next, an Inference engine allows new knowledge to be inferred. For example, the inference engine may determine that a user is matched more often to postings when the user input 120 includes "self-starter"+"nurse" rather than just the keyword "nurse" alone. Most commonly, it can take the form of IF-THEN rules coupled with forward chaining or backward chaining approaches. Forward chaining starts with the known facts and asserts new facts. Backward chaining starts with goals and works backward to determine what facts must be asserted so that the goals can be achieved. Other approaches include the use of automated theorem provers, logic programming, blackboard systems, and term rewriting systems such as CHR (Constraint Handling Rules). For example, following the IF-THEN rule format, the inference engine could devise "if user input consists of being a nurse with 20 years of experience and 5 years traveling experience then that user input is compatible with the posting input consisting of a charge nurse with 10 years of experience and some travel experience". The inference engine may make predictions or decisions in optimizing classifying postings to a user without being explicitly programmed to do so. The inference engine may receive constant feedback and self-learn based on previous classifications, as described through this disclosure, and recommendations to further refine and strengthen its recommendations.

Still referring to FIG. 1, processor 104 and/or computing device 112 is configured to classify the user to a posting category as a function of the comparison. Classifier 136 may include a classification algorithm wherein the algorithm output is a plurality of postings optimized for the user. In some embodiments, postings optimized for the user are postings not solely tailored to previous job titles or degrees/certifications of a user, but a wide range of optimal job postings based on a variety of user inputs the algorithm determines suitable for user. For example, a user with a STEM degree in engineering may be recommend, using the classification algorithm, a snake milker posting, based on background experience in herpetology, instead of just typical engineering roles commonly associated with the degree. In some embodiments, the classification algorithm may take a plurality of user inputs as inputs, wherein the training data includes a plurality of posting inputs, posting database, past matches of users to postings, data from a KBS, output data of any other classification/comparison described throughout this disclosure, and the like.

Still referring to FIG. 1, processor 104 and/or computing device 112, as a function of the comparison, may be configured to rank a plurality of postings in order of similarity to a user experience record, wherein a rank of postings is based on the similarity score. In some embodiments, generating the ranking may include linear regression techniques. Processor 104 and/or computing device 112 may be designed and configured to create a machine-learning module using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm 11 mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 1, processor 104 and/or computing device 112 may be configured to use classifier to classify, as a function of ranking, the user to a ranked plurality of postings. For example, processor 104 and/or computing device 112 may take posting inputs 128 of the ranked postings and sort into categories, selectable by user, such as: contract, temporary, hybrid, relocation stipend, and the like. In some embodiments, processor 104 and/or computing device 112 may be configured to produce classification output results 136 including the classified ranked postings in a selectable format by user, including at least the ranked postings with the similarity score displayed by each posting. For example, user may select to output classified ranked postings in a pie chart, wherein the ranked classified postings are divided, and color coded in selectable classification bins, showing the number of postings that fall into a classification.

Still referring to FIG. 1, processor 104 and/or computing device 112 may be configured to generate classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 and/or computing device 112 may then calculate a likelihood table by calculating probabilities of different data entries and classification labels. Processor 104 and/or computing device 112 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 and/or computing device 112 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 2:
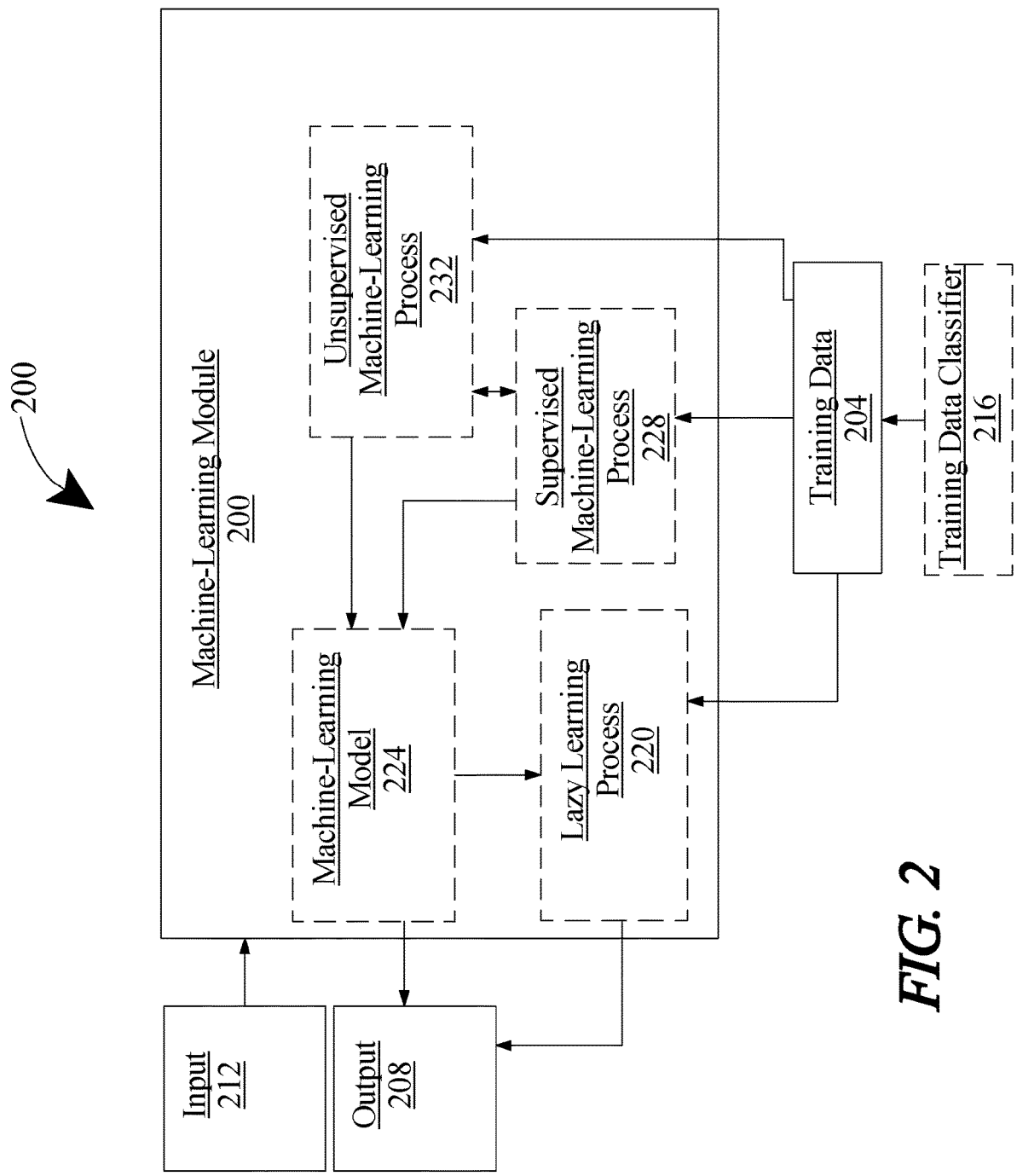
FIG. 2 is a block diagram of exemplary machine-learning processes.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. For example, training data 204 may consist of a plurality of user and posting inputs, along with feedback and/or reviews of past user to posting matches. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or experience Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
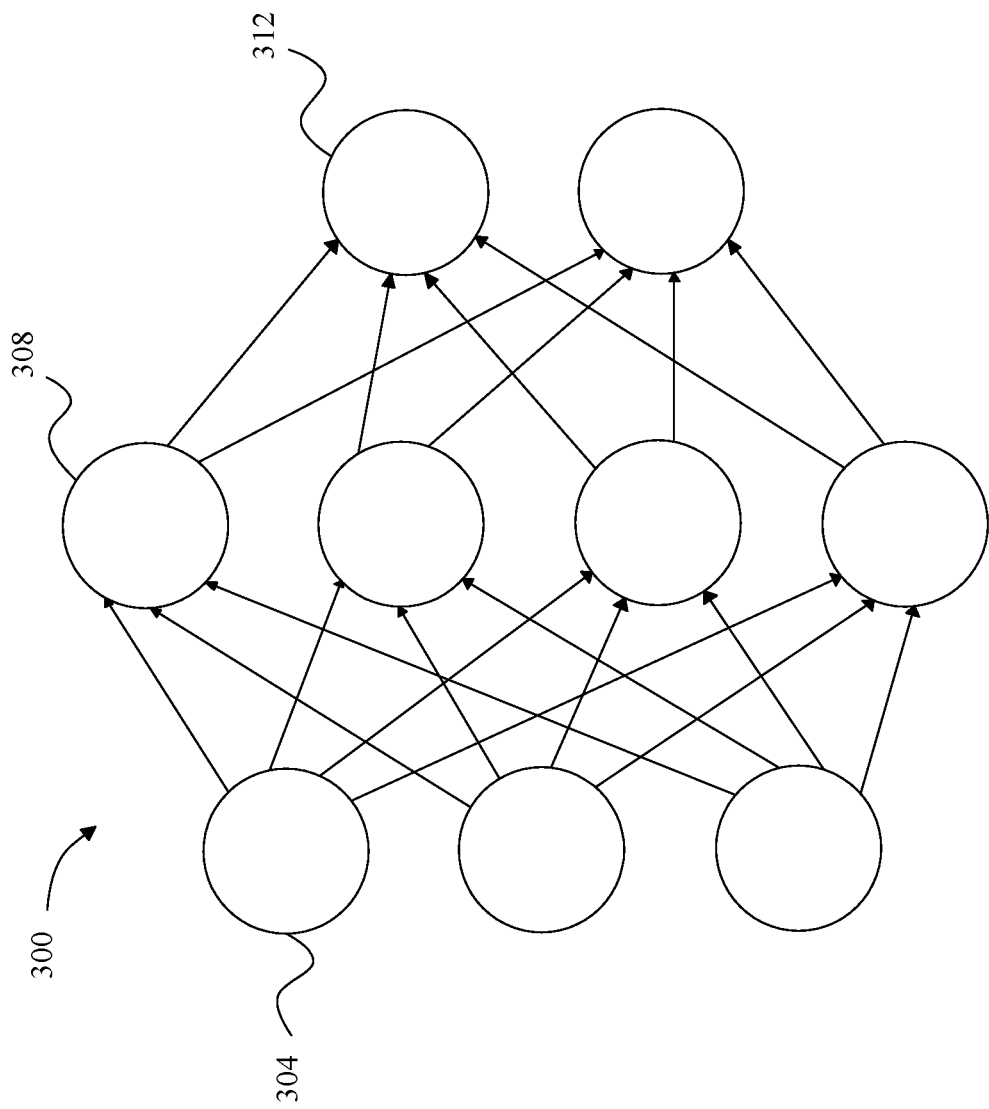
FIG. 3 illustrates an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
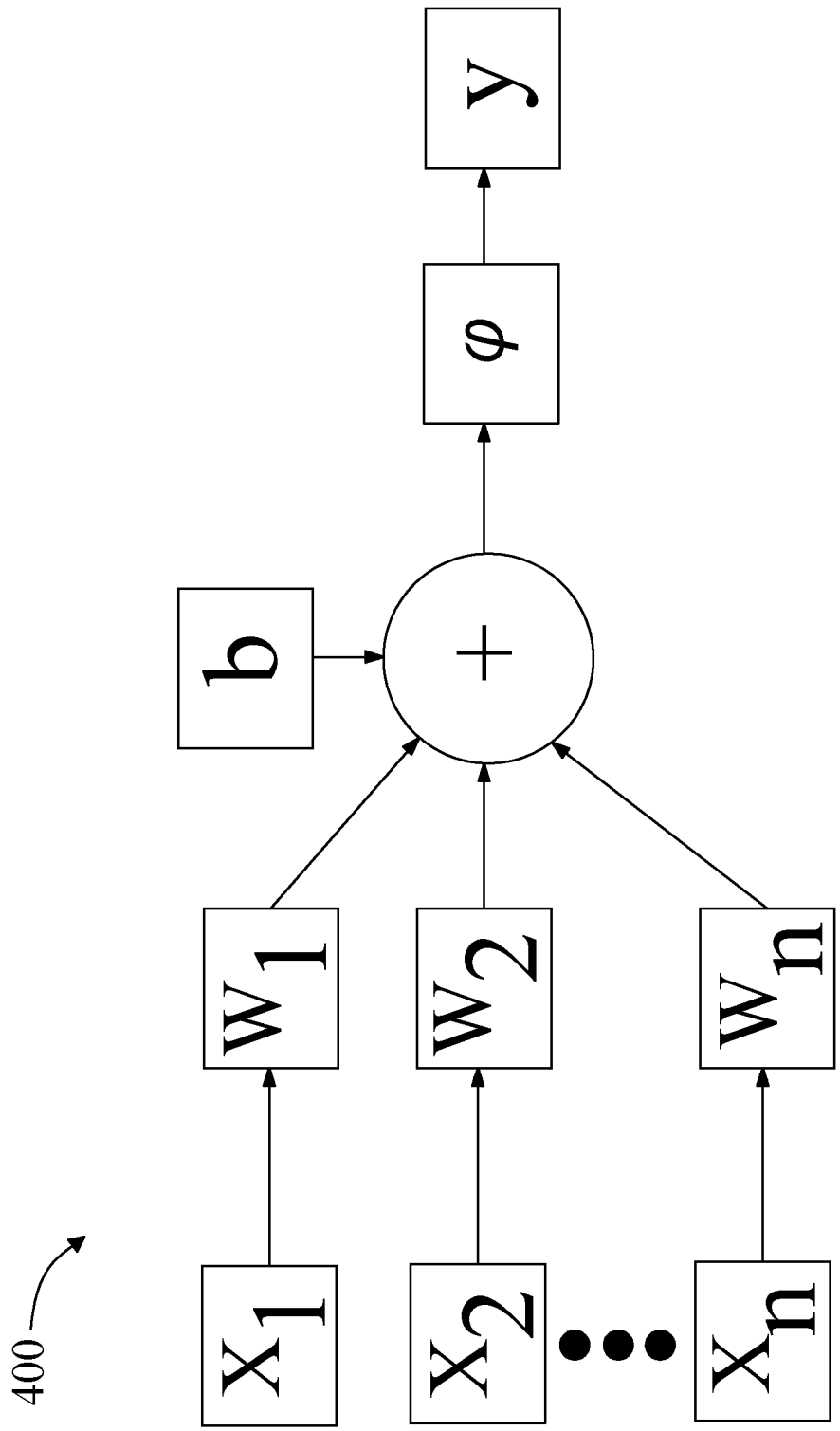
FIG. 4 is a block diagram of an exemplary embodiment of a node of a neural network.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
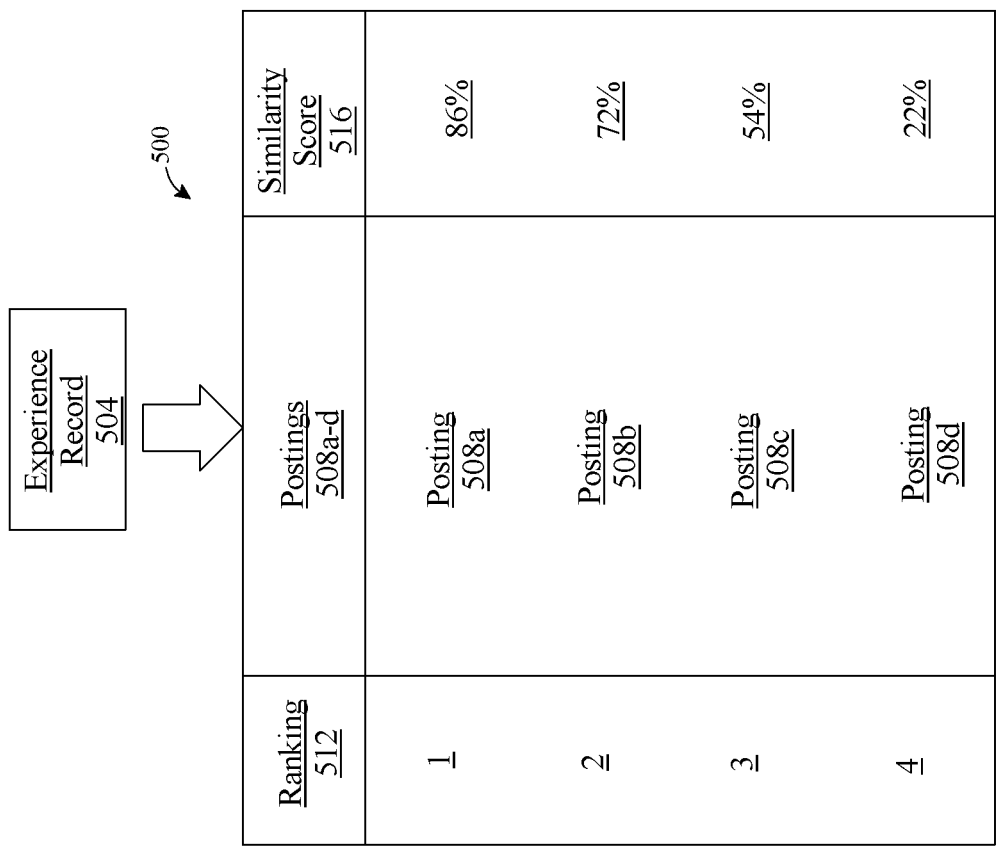
FIG. 5 is a table representing an exemplary association between a user experience record and a plurality of postings.

Referring now to FIG. 5, table 500 is depicted illustrating an association between a user's experience record and a plurality of postings. Table 500 illustrates the user input of the experience record as the basis for ranking the job postings. Table 500 may contain a few columns, for example ranking column 512, postings column 508a-d, and similarity column 516. Table 500 may include more than one factor column corresponding to other factors. For example, ranking column 512 may include a ranking of postings 508a-d from most similar to user experience record 504, posting 508a, to a least similar, posting 508d.

Figure 6:
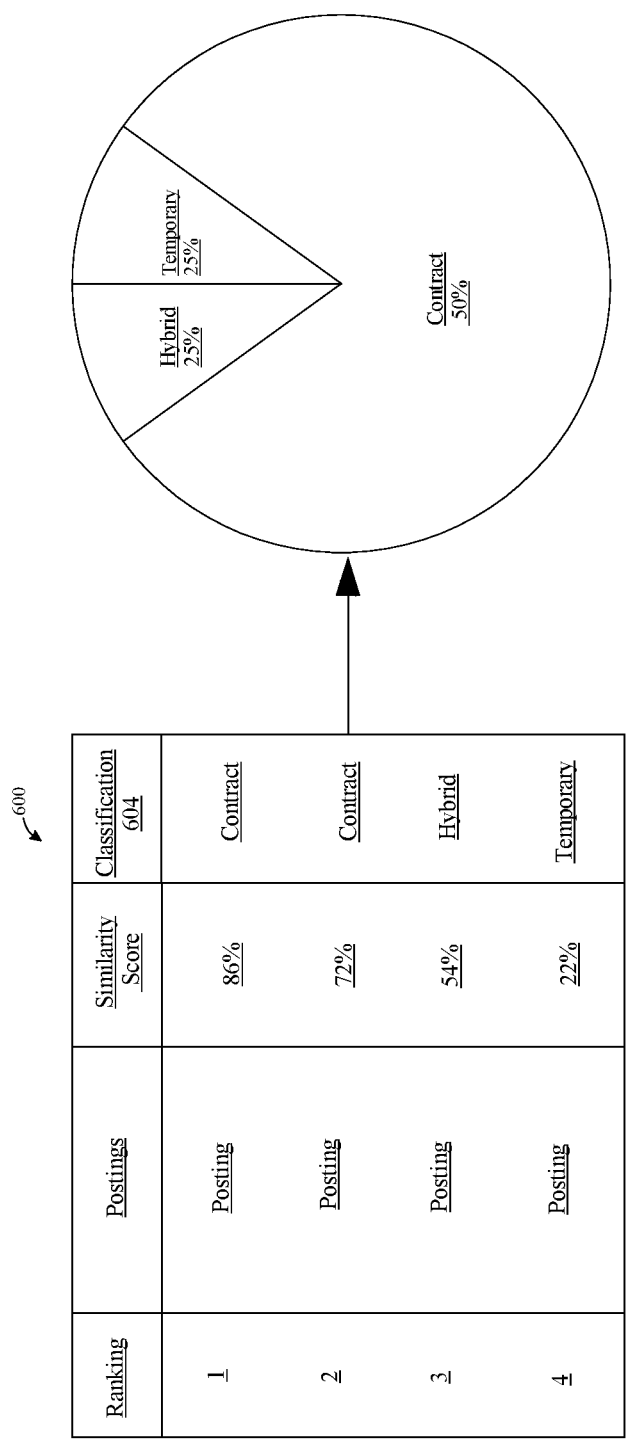
FIG. 6 is an exemplary diagrammatic representation of classification of ranked postings.

Referring now to FIG. 6, chart 600 depicts exemplary classification of ranked posting into categories. Chart 600 may be in numerous selectable graphs and/or chart formats by user. Similar to table 500, however, chart 600 may include a classification column 604 wherein ranked postings are ranked in descending order based upon a similarity score. User may select classification column 604 to be represented, for example, as a pie chart, presenting the percentage of postings that are classified into each category. The range of categories may also be selected by user such as, length of employment, immediate hire, responsive employers, offered salary, and the like.

Figure 7:
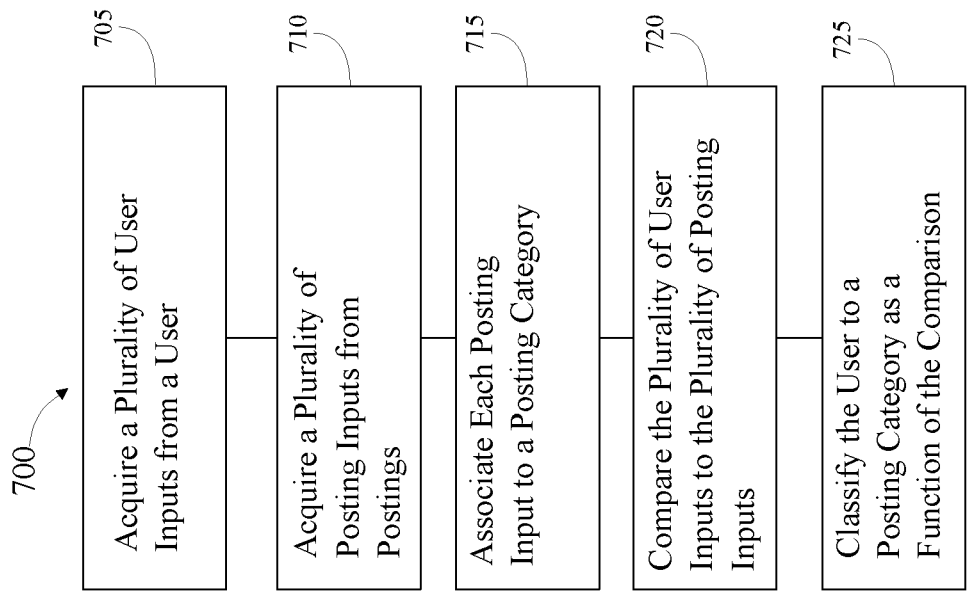
FIG. 7 is a flow diagram illustrating an exemplary method of classifying a user to a posting.

Referring now to FIG. 7, a flow diagram illustrating an exemplary method for using a computing device including machine learning to classify a user to a posting. Computing device may be any computing device referred in this disclosure, for example and with reference to FIG. 1. At step 705, method includes a computing device configured to acquire a plurality of user inputs form a user. For example, the user may upload their experience record to the computing device to process user input contained in the experience record, as defined, and disclosed in FIG. 1. Extraction of user input may involve computing device to utilize a language processing module as disclosed in FIG. 1. Similarly, at step 710, method includes using the computing device to acquire a plurality of posting input from postings. A posting, as defined in FIG. 1, may be a job posting from an employer. The posting input may include at least a list of skill requirements of the employer for example and with reference to FIG. 1. A plurality of postings may be stored in a database, for example and with reference to FIG. 1. Extraction of posting inputs may utilize a language processing module as disclosed in FIG. 1. In some embodiments, the experience record and the plurality of postings may in the form of video record wherein verbal and non-verbal user and posting inputs are transcribed into textual data, as disclosed in FIG. 1.

Still referring to FIG. 7, at step 715, method includes using a computing device to associate each posting input of a plurality of posting inputs to a posting category. As previously defined, a posting category may group inputs associated with job titles, salaries, locations, experience, technological backgrounds, and the like from a posting, for example and with reference to FIG. 1. The computing device may use a classifier, as described in FIG. 1, to match posting inputs to a particular posting category. Classifier may be configured to output at least a datum that labels or otherwise identifies a set of data that are clustered together, found to be close under a distance metric as described below, or the like. For example, a plurality posting inputs may be classifier inputs that get outputted to a plurality of posting categories outputs. In some embodiments, classifier training data may include posting database, wherein database includes a plurality of input entries of postings. Classifier training data may also include sample posting categories from a plurality of postings Still referring to FIG. 7, at step 720, method includes using a computing device to compare, a plurality of user inputs to a plurality of posting inputs. The process of comparing inputs may be accomplished by any process described throughout this disclosure, for example and with reference to FIGS. 1 and 2. Comparing inputs may include machine learning processes, wherein a machine learning algorithm input includes the plurality of user and posting inputs and the algorithm output is a similarity score, for example and with reference to FIGS. 1 and 2. A similarity score, as defined in FIG. 1 is a unit of measurement representing the similarity between a user's experience record and a posting. The similarity score may be configured using a language processing module, as disclosed and with reference to FIG. 1. Alternatively or additionally, comparison may include a knowledge-based system or classification as described in FIG. 1.

Still referring to FIG. 7, at step 725, method includes using a computing device to classify the user to a posting category as a function of the comparison. At this step, computing device may use a classifier, as defined in FIG. 1. Classification may be accomplished by any process described throughout this disclosure, for example and with reference to FIGS. 1 and 2. Classification may include a classification algorithm wherein the algorithm output is a plurality of postings optimized for the user, for example and with reference to FIG. 1. In some embodiments, postings optimized for the user are postings not solely tailored to previous job titles or degrees/certifications of a user, but a wide range of optimal job postings based on a variety of user inputs the algorithm determines suitable for user.

In some embodiments, method may include using a computing device to rank, as a function of the comparison, a plurality of postings in order of similarity. The ranking may be based off a similarity score for each posting. The ranking may be accomplished by any process described throughout this disclosure, for example and with reference to FIGS. 1 and 5. In some embodiments, generating the ranking may include linear regression techniques. Computing device may be designed and configured to create a machine-learning module using techniques for development of linear regression models, as disclosed in FIGS. 1 and 2.

Still referring to FIG. 7, in some embodiments, posting may be classified as a function of the ranking. Classification may be accomplished by any process described throughout this disclosure, for example and with reference to FIGS. 1 and 2. For example, computing device may take posting inputs of the ranked postings and sort into categories, selectable by user, such as: contract, temporary, hybrid, relocation stipend, and the like. In some embodiments, computing device may be configured to output classification results including the classified ranked postings in a selectable format by user, including at least the ranked postings with the similarity score displayed by each posting. For example, user may select to output classified ranked postings in a pie chart, wherein the ranked classified postings are divided, and color coded in selectable classification bins, showing the number of postings that fall into a classification.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
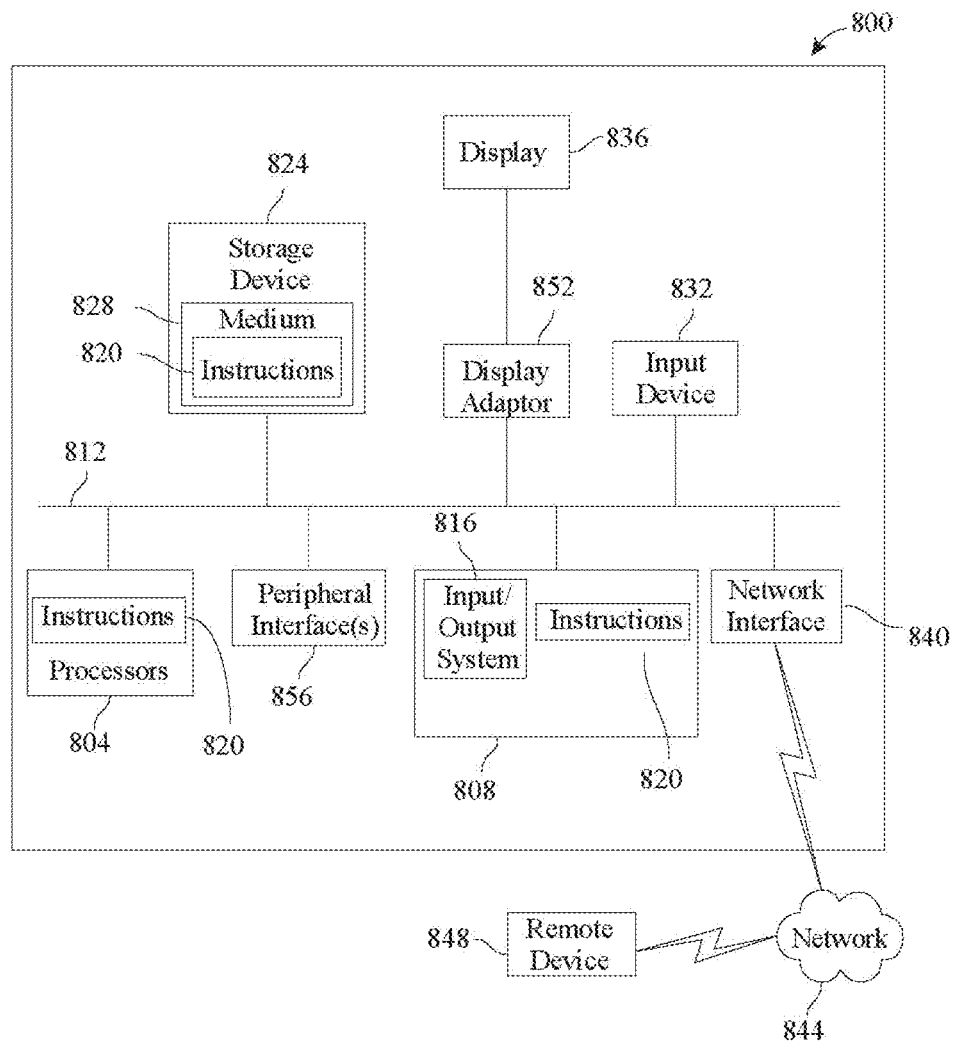
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for using machine learning to classify a user to a posting, the apparatus comprising:
    at least a processor; and
    a memory communicatively connected to the processor, the memory containing instructions configuring the at least a processor to:
    acquire a plurality of user inputs from a user comprising:
        receiving textual data;
        receiving a plurality of identified documents;
        analyzing one or more words extracted from the plurality of identified documents using a language processing module;
        comparing the textual data to the one or more words; and
        extracting the plurality of user inputs from the textual data as a function of the comparison;
    acquire a plurality of posting inputs from a plurality of postings, wherein a posting input comprises at least a desired employee personality trait;
    compare the plurality of user inputs to the plurality of posting inputs, wherein the plurality of user inputs are compared to the plurality of posting inputs utilizing a knowledge-based system, and wherein the knowledge-based system further comprises a knowledge base and an inference engine; and
    classify the user to a posting category as a function of the comparison, wherein classifying the user to the posting category comprises:
        training, iteratively a machine learning model using training data and a machine learning algorithm, wherein the training data includes the plurality of user and the plurality of posting inputs correlated with similarity scores; and
        generating a similarity score using the trained machine learning model wherein the plurality of user inputs and the plurality of posting inputs are provided as an input to the trained machine learning model to output an updated similarity score;
    output a plurality of job postings matching the posting category based on the updated similarity score;
    rank the plurality of job postings as a function of the updated similarity score; classify the plurality of job postings to at least a category; and
    output the classified ranked job postings in a color-coded pie chart.

2. The apparatus of claim 1, wherein a user input is acquired from at least an experience record of a user.

3. The apparatus of claim 1 wherein a posting input further comprises at least a list of skill requirements.

4. The apparatus of claim 1, wherein the plurality of postings are video records.

5. The apparatus of claim 1, further comprising the language processing module to acquire the similarity score.

6. The apparatus of claim 1, wherein a ranking of the plurality of postings is based on the similarity score.

7. The apparatus of claim 6, wherein the ranking of the plurality of postings is configured using at least linear regression techniques.

8. The apparatus of claim 1, wherein classifying the user to the posting category comprises a classifier algorithm wherein the algorithm output is a plurality of postings optimized for the user.

9. A method for using machine learning to classify a user to a posting, the method comprising:
    acquiring, using a computing device, a plurality of user inputs from a user comprising:
        receiving textual data;
        receiving a plurality of identified documents;
        analyzing one or more words extracted from the plurality of identified documents using a language processing module;
        comparing the textual data to the one or more words; and
        extracting the plurality of user inputs from the textual data as a function of the comparison;
    acquiring, using the computing device, a plurality of posting inputs from a plurality of postings, wherein a posting input comprises at least a desired employee personality trait;
    comparing, using the computing device, the plurality of user inputs to the plurality of posting inputs, wherein the plurality of user inputs are compared to the plurality of posting inputs utilizing a knowledge-based system, and wherein the knowledge-based system further comprises a knowledge base and an inference engine; and
    classifying, using the computing device, the user to a posting category as a function of the comparison, wherein classifying the user to the posting category comprises:
        training, iteratively a machine learning model using training data and a machine learning algorithm, wherein the training data includes the plurality of user and the plurality of posting inputs correlated with similarity scores; and
        generating a similarity score using the trained machine learning model wherein the plurality of user inputs and the plurality of posting inputs are provided as an input to the trained machine learning model to output an updated similarity score;
    outputting a plurality of job postings matching the posting category based on the updated similarity score;
    ranking the plurality of job postings as a function of the updated similarity score;
    classifying the plurality of job postings to at least a category; and
    outputting the classified ranked job postings in a color-coded pie chart.

10. The method of claim 9, wherein a user input is acquired from at least an experience record of a user.

11. The method of claim 9 wherein a posting input comprises at least a list of skill requirements.

12. The method of claim 9, wherein the plurality of postings are video records.

13. The method of claim 9, further comprising the language processing module to acquire the similarity score.

14. The method of claim 9, wherein a ranking of the plurality of postings is based on the similarity score.

15. The method of claim 14, wherein the ranking of the plurality of postings is configured using at least linear regression techniques.

16. The method of claim 9, wherein classifying the user to the posting category comprises a classifier algorithm wherein the algorithm output is a plurality of postings optimized for the user.

* * * * *